US007178784B2

(12) United States Patent
Flynn

(10) Patent No.: US 7,178,784 B2
(45) Date of Patent: Feb. 20, 2007

(54) VALVE ASSEMBLY AND METHOD

(75) Inventor: William T. Flynn, Horton, MI (US)

(73) Assignee: Eaton Corporation, Cleveland, OH (US)

( * ) Notice: Subject to any disclaimer, the term of this patent is extended or adjusted under 35 U.S.C. 154(b) by 108 days.

(21) Appl. No.: 10/698,135

(22) Filed: Oct. 31, 2003

(65) Prior Publication Data

US 2005/0092958 A1 May 5, 2005

(51) Int. Cl.
*F16K 51/00* (2006.01)
*F16L 29/00* (2006.01)
*F16L 37/28* (2006.01)

(52) U.S. Cl. ............... 251/149.6; 137/536; 137/543.13

(58) Field of Classification Search ................ 251/322, 251/323, 149.6; 137/536, 542, 543, 543.13, 137/514.7
See application file for complete search history.

(56) References Cited

U.S. PATENT DOCUMENTS 2,594,641 A * 4/1952 Griffith et al. .............. 137/543
2,928,417 A 3/1960 Brown et al.
2,973,008 A * 2/1961 Klose .................... 137/516.29
3,134,394 A * 5/1964 Ohta .......................... 137/220
3,800,824 A * 4/1974 Medina ...................... 137/541
4,543,988 A 10/1985 Huveteau
4,964,391 A * 10/1990 Hoover ....................... 123/510
5,421,306 A 6/1995 Talaski
5,921,276 A * 7/1999 Lam et al. ............... 137/514.7
6,427,711 B1 8/2002 Kemp
6,899,113 B2 * 5/2005 Parrish et al. ................. 137/1

FOREIGN PATENT DOCUMENTS

DE 4342577 6/1995

OTHER PUBLICATIONS

European Search Report dated Jan. 10, 2005.

* cited by examiner

*Primary Examiner*—Edward K. Look
*Assistant Examiner*—John K. Fristoe, Jr.
(74) *Attorney, Agent, or Firm*—Benesch, Friedlander Copan & Aronoff LLP

(57) ABSTRACT

The present invention discloses, among other things, a valve assembly that includes a body, a valve, a biasing mechanism, and a guide. The body includes a shaped cavity and the valve includes an elongated portion and a shaped valve head that has an exterior surface portion that is configured to engage a portion of the shaped cavity. The guide includes a central axis and a centrally disposed opening that receives a portion of the valve and guides the movement of the valve through at least a segment of the valve's axial motion. The biasing mechanism, which may include a spring, biases the valve head in the direction of the shaped cavity. The invention further includes a method for making a valve assembly.

38 Claims, 2 Drawing Sheets

16 39a 36 38 42 39b CA CA 32 3 36 32 36 36 16 3

FIG 1
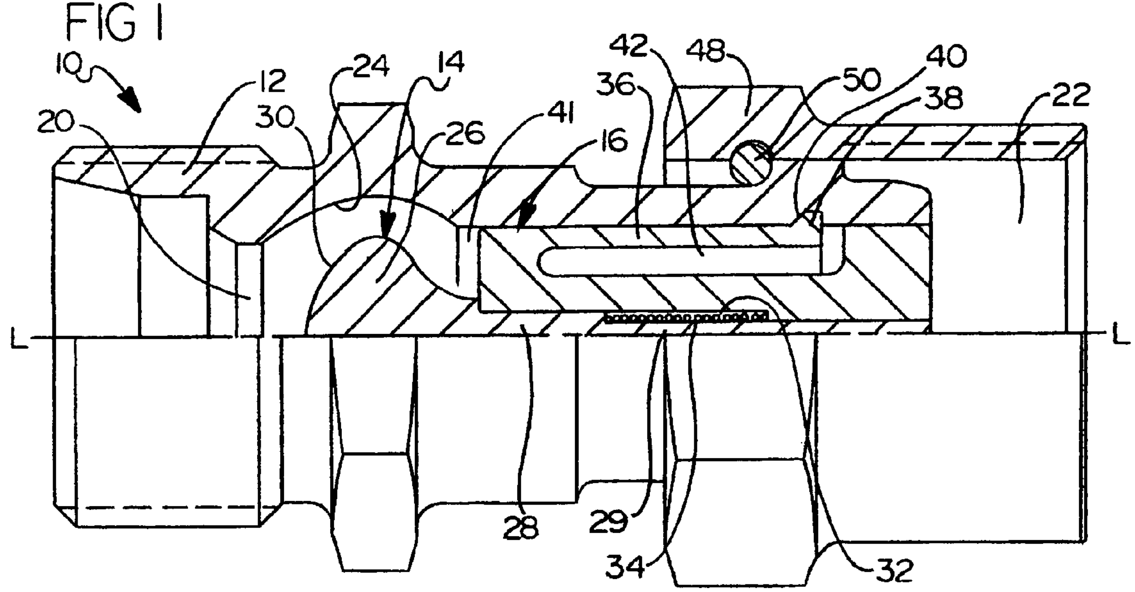
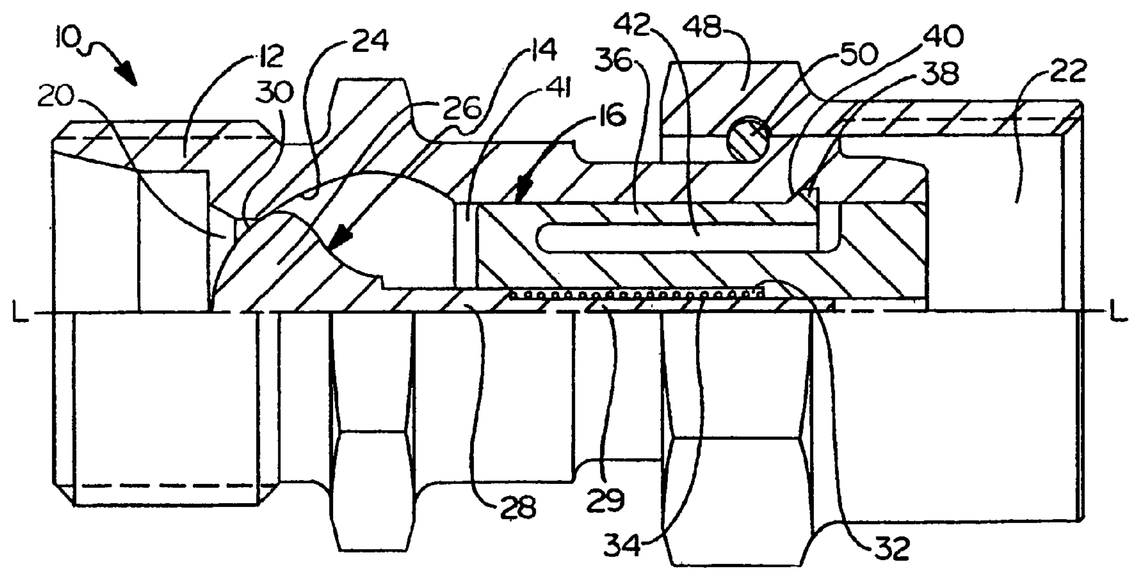
FIG 2

3
3
36
36
36
32
16

39b
CA
42
38
36
16
32
39a
CA

VALVE ASSEMBLY AND METHOD

FIELD OF THE INVENTION

The present invention relates generally to valve assemblies and methods for making such assemblies.

BACKGROUND OF THE INVENTION

Valve assemblies, including check valves, are used in a wide variety of industries for an extensive range of applications. In many applications, hydraulic valves are required to meet certain weight and space, or "envelope," constraints in view of high flow rates and high operating pressures. In view of weight and space restrictions, check valve manufacturers are commonly forced to utilize single piece housings for the body, which commonly restrict the size of the internal components to the size of the associated coupling or adapter inlet/outlet ports through which they must pass.

A common performance characteristic associated with check valves is the degree of pressure drop. Users typically want to have the lowest pressure drop that is reasonably attainable. However, the obtainable pressure drop is inversely proportional to the reduction of the flow path cross sectional area through the valve housing. Factors that contribute to the pressure drop of hydraulic or pneumatic fluid conveyance devices include: a) fluid drag along the walls and surfaces; b) changes in direction of flow; c) the division of flow paths (such as the division of a single flow into several flow paths and corresponding merging of such flow paths back into a single path); d) acceleration and deceleration of the flow stream; and e) the formation and presence of eddy currents or non-laminar flow.

It is generally desirable to provide a valve with less (or reduced) pressure drop and lower assembly cost, while providing a reduced envelope and weight as compared to traditional valves. Two-piece valve housings with a large flow path may offer a corresponding low pressure drop, but often at the sacrifice of additional weight and size, assembly requirements, and cost. A balancing of factors and features is commonly necessitated. The present invention is developed in light of these and other considerations.

BRIEF SUMMARY OF THE INVENTION

Among other things, the present invention discloses a valve assembly that includes a body, a valve, a biasing mechanism, and a guide. The body includes a shaped cavity and the valve includes an elongated portion and a shaped valve head that has an exterior surface portion that is configured to engage a portion of the shaped cavity. The guide includes a central axis and a centrally disposed opening that receives a portion of the valve and guides the movement of the valve through at least a segment of the valve's axial motion. The biasing mechanism may include a spring that selectively biases the valve head in the direction of the shaped cavity. The invention further includes a method for making a valve assembly.

Other aspects of the invention will be apparent to those skilled in the art after reviewing the drawings and the detailed description below.

BRIEF DESCRIPTION OF THE DRAWINGS

The present invention will now be described, by way of example, with reference to the accompanying drawings, in which:

FIG. 1 is a partial cross sectional view of an embodiment of a valve assembly shown in a generally "open" configuration.

FIG. 2 is a partial cross sectional view of an embodiment of a valve assembly of the type depicted in FIG. 1, generally shown in a "closed" configuration.

DETAILED DESCRIPTION OF THE INVENTION

Figure 4:
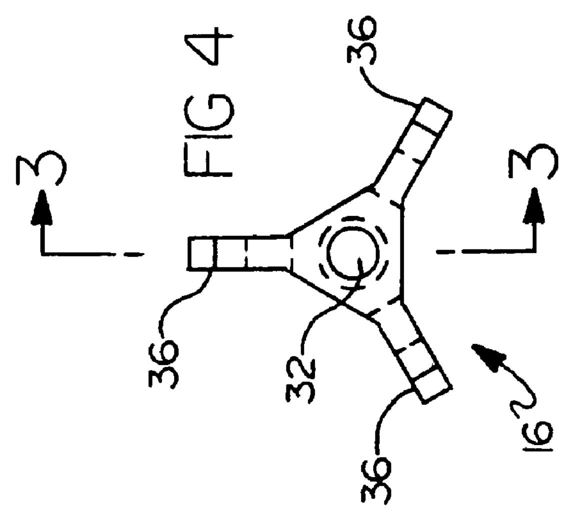
FIG. 4 is front view of a valve guide of the type shown in FIG. 3.

FIG. 1 illustrates a cross sectional view of a valve assembly 10 shown in accordance with an embodiment of the invention. The valve assembly 10 is shown in a generally "open" flow configuration and includes a body 12, a valve 14, and a guide 16. The body 12 includes a central longitudinal axis L, a fluid entry portion 20, a fluid outlet portion 22, and an expanded cavity 24 with a shaped portion. In an embodiment of the invention, the shaped portion of the cavity 24 is in the form of a modified ellipsoid. The assembly 10 may take the form of a check valve and, for many applications, the body 12 can be comprised of an integral, single-piece housing. Moreover, if desired, the assembly 10 can be a configured for use as a standard coupling or adapter that may be configured to be mated with male-to-male or male-to-female fittings, including, without limitation, industry standard end fittings. The assembly of the present invention is not limited to a specific size and can cover a wide range of both conventional and unconventional sizes.

The valve 14 includes a valve head 26 and an elongated portion 28. In some embodiments, the ends of the spring engage an edge of the valve on one side and an edge of the guide on the other. The elongated portion 28 may include a stem portion 29 that has a reduced diameter compared to the segment of the elongated portion nearer the valve head 26. For embodiments that include such a stem portion 29, it is preferred that the elongated portion 28 and the stem portion 29 of the valve 14 engage two separate radially spaced segments of the guide 16 having different diameters. Such a configuration can, among other things, serve to: maintain a truer linear axial travel of the valve 16 through a stroke; maintain more accurate positioning of the valve at the body's valve seat; better support or guide a biasing mechanism (as discussed in further detail below); and/or, in the case of a biasing mechanism comprised of a spring 34, help prevent the compression of the spring coils from overlapping during valve travel or during assembly.

In an embodiment of the invention, the valve head 26 includes a shaped portion having a modified ellipsoid form (viewed from a side cross sectional view such as shown in FIG. 1). The shaped portion of the cavity can be configured so that the cross sectional flow area past the valve head and through the valve is more consistent. As such, the shaped portion of the valve head 26 may have a surface that is a combination of several tangent radii. For instance, the surface may be comprised of four, five, or more radii with tangents (viewed in cross section) that work together to form a continuous surface. The specific radii associated with the shaped portion can be run through physical and analytic analysis and testing to determine specific configurations that are more conducive to improved valve operation, for example, a more consistent flow area through the assembly, reduced eddies, and more consistent cross sectional flow. As generally illustrated, the valve head 26 includes an exterior surface segment or portion 30 that substantially matches up with a similarly shaped portion of the cavity 24 of the body 12 at least at one point (or segment) of contact. Moreover, if desired, or if necessary for a given application, the external surface of the valve head 26 and corresponding and contacting surface portion of the cavity 24 can be tightly toleranced to prevent leakage.

Together, the valve head 26 and the cavity 24 form a flow passage through which a fluid may pass through the assembly 10. The associated guide 16 can serve several functions. Among other things, the guide 16 can (i) set or guide the travel of the valve 14 through all or a portion of its travel within the body 12, (ii) serve to stop and position the valve 14 at the full open position, and (iii) house or support a mechanism that positions the valve. Guide 16 preferably includes a front portion, which is a segment of the guide that is located in closer proximity to the valve head 26; a rear portion, which is a segment of the guide located in closer proximity to the fluid outlet portion 22; and an opening 32 with a central axis CA that receives and guides a portion of the valve 14. In an embodiment, the guide opening 32 receives and supports the elongated portion 28 of the valve and that portion 28 is permitted to move in a substantially linear axial manner along an adjacent length of the opening 32.

The valve assembly 10 may optionally include a mechanism that biases (and may selectively bias) the valve head 26 toward a forward position relative to the fluid entry portion 20. In the illustrated embodiment, the biasing mechanism includes a spring 34 that may provide a sufficient force, absent other external forces (including the flow of fluid), to generally urge a portion of the surface 30 of the valve head 26 against the interior wall of the cavity 24 to close the fluid passage formed between the cavity 24 and the head 26. For proper closure, the surface of the valve head and the surface of the cavity should be substantially tangent to one another at the point (or segment) of contact.

FIG. 2 illustrates a valve assembly, such as that shown in FIG. 1, which is shown in a substantially "closed" configuration. The present invention permits the biasing mechanism (e.g., spring 34) to be located outside of the fluid flow path, which, inter alia, eliminates the mechanism from causing a further obstruction to the flow and can provide better durability and reliability, for example, by reducing the corrosive effect to fluid on the biasing mechanism. In a preferred embodiment in which a spring 34 is the biasing mechanism, the spring 34 can be sufficiently constrained between two surfaces (e.g., the surfaces of the valve and the guide) so that the spring cannot overlap or otherwise significantly depart from its intended path of movement.

If desired, the guide 16 may be configured to provide a dampening effect. That is, the variable volume cavity in which the biasing mechanism, such as a spring 34, is located generates a hydraulic dampening effect in connection with normal valve 14 opening and closing. The clearance between the associated mating surfaces (i.e., stem diameter of the valve 14 and the corresponding aperture diameter in the valve guide 16) can be tightly or more closely toleranced to control the amount of dampening, for instance by frictional engagement between components. Controlling the amount of dampening, among other things, can: adjust and control the speed of the valve during opening and closing, decrease the valve's impact energy with the seat in the body and the valve guide, and tend to increase the useful life of the components.

Figure 3:
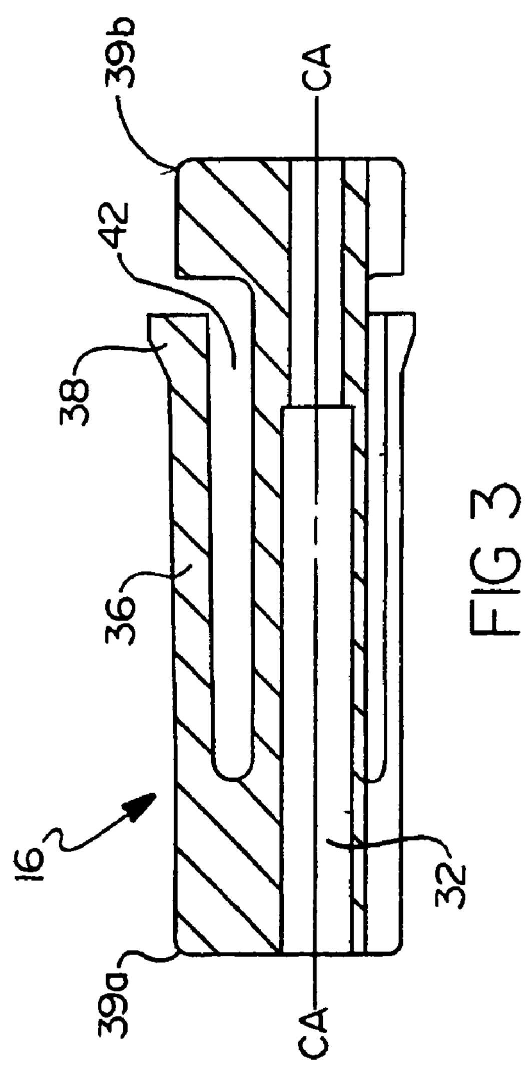
FIG. 3 is a cross sectional view of an embodiment of a valve guide.

FIGS. 3 and 4 illustrate a side cross sectional and a rear view of a guide 16 shown in accordance with an embodiment of the invention. Guide 16 preferably includes at least one guide leg 36 and may additionally include a connection element 38 that connects the guide 16 to a portion of the body 12 and/or serves to help prevent axial travel of the guide 16 relative to the body. As described further herein, the connection element 38 may be spring-loaded or biased radially outwardly to provide a more secure fit with the body 12. Moreover, the guide 16 may be manufactured from a number of materials, provided the necessary strength, durability, and functionality are maintained. In a particular embodiment, the guide 16 is comprised of a tempered steel alloy. The guide leg 36 may include longitudinally or axially spaced segments (e.g., a front segment and a rear segment), or, for some embodiments, the guide leg 36 may run substantially the entire length of the guide 16. Additionally, in some embodiments, a portion of the guide leg may be spaced from the main body of the guide and may be cantilevered or configured to taper slightly outwardly (taken in the direction of the intended fluid flow) in its normal unassembled condition and provide a fairly consistent spring pre-load radially outward into the body 12. In that regard, the guide leg 36 can be configured to provide a measure of deflection, which can range, for example, from 0.005 to 0.032 inches, and can help to interconnect the guide 16 within the body 12 and retain it in a desired position while still permitting a fluid to flow past the guide 16 through the assembly 10. In some embodiments the fit of the guide should be relative close or sufficiently snug to avoid undesired movement or rattle. In addition to the inclusion of a connection element 38, the shape of the leg 36 and amount of taper can be configured to optimize the wedging or "fit" of the guide 16 within the body 12.

While the invention is not limited to the embodiments illustrated in the drawing figures, some mention of the optional characteristics associated with an exemplary guide 16 and associated guide legs 36, such as illustrated in FIG. 3, may be beneficial. Each of the legs 36 may include a fixed front centering portion or member (e.g., element **39*a*) and a fixed rear centering portion or member (e.g., element 39*b*). One or more of the legs 36 may include an intermediate, flexible, cantilevered, spring-loaded leg 36 and may further include an integral locking member (e.g., connection element 38). It is noted that the assembly 10 can include various combinations of one or more such members 39*a*, 39*b*, or 38. However, for purposes of illustration only, three front and rear centering formations are included, each of which may (or may not) include a connection element 38**.

Continuing with the exemplary embodiment, the rear centering formations **39*b* preferably engage the inside wall of the body 12 and position and align the center of the valve guide 16 with the center of the body 12 at or adjacent to the fluid outlet portion 22. The front centering formation 39*a* engages the inside wall of the body 12 at or adjacent a throat area 41 to position and align the center of the valve guide 16 with the center of the body 12 at or about the throat area. Preferably, the front and rear centering formations 39*a*, 39*b* are positioned (often as far as possible from each other) to provide sufficient longitudinal stability. The combination of the front centering formations 39*a* in-concert with the rear centering formations 39*b* align, position and maintain the center-line of valve guides opening 32 with the center-line axis of the body 12. The plurality of contact points offset some distance apart along the length of the guide 16 helps to ensure that the linear travel of the valve 14 is in proper central longitudinal alignment with the body 12**, which typically improves the tightness of the seal associated with the assembly.

In an embodiment of the invention, the body 12 may include formations, such as longitudinally extending grooves that, for example, may receive fin-like segments of the guide legs 36. The body 12 may additionally include one or more recesses or cavities, such as receiving element 40, which receive and help retain a portion of the guide leg 36 (which may include the connection element 38) at a desired position along the axial length of the assembly. In addition to centering the guide 16 within the cavity (and prohibiting rotation thereof), the grooves can also serve to facilitate the interconnection of the connection elements 38 with corresponding receiving elements 40.

Retaining formations can typically be located anywhere in the body wall where they do not create an unacceptable stress concentration point which could generate a future fatigue structural failure mode. In some preferred embodiments, the grooves, recesses, or other attachment formations associated with the guide 16 are positioned beneath a shoulder of an associated fitting. For example, without limitation, such retention formations may be located within the external shoulder of a flare-less female fitting. Such a configuration can provide a measure of strength and reinforcement, help reduce the amount of stress on the body 12, and increase fatigue life. It is noted, however, that the guide 16 is not limited to a configuration with a single guide leg 36. Rather, the guide preferably includes a plurality of guide legs having various forms, including, for example, a guide 16 with three guide legs 36 as shown in FIG. 4. With such an exemplary three-legged embodiment, the guide legs 36 may, by way of example and without limitation, take the form of relatively thin (e.g., less than 0.1 inch) support structures that extend the majority of the longitudinal length of the guide 16 and are circumferentially spaced apart (e.g., approximately 120 degrees from each another).

It is noted that the present invention can provide a significant increase in the cross sectional area of the flow path by moving the guide function, stop function and spring (or other mechanism for biasing the valve) from the radial area adjacent the inside walls of the body housing to substantially the centerline of the valve assembly. Moreover, the transitions of flow are also commonly improved with such a configuration, for example, by providing a relatively consistent fluid velocity and reducing the number of acceleration and decelerations in the fluid flow path.

In an embodiment, the body 12 includes a formation that receives a portion of the connection element 38 to at least partially secure the guide 16 within a segment of the body 12. FIGS. 1 and 2 generally illustrate an embodiment wherein the body 12, includes a receiving formation 40, in this case a groove or recessed portion, which receives a portion of the connection element 38 of the guide 16. In one particular embodiment, a gap 42 is formed between a central portion of the guide 16 and the guide leg 36. The guide leg further includes a connection element 38 in the form of a protruding bump or other radially extending formation that is positioned at or about the linear extent of the guide leg 36. The gap 42 permits a radially extending connection element to be moved (typically temporarily) in an inward radial direction as the guide 16 (whether taken alone or as part of a subassembly with a valve) is positioned within a segment of the body 12. With such a configuration, as shown, the connection element 40 will eventually move or snap into position within a receiving portion 40. Thereafter, an interference formed between a portion of the connection element 38 and the receiving portion 40 of the body 12 will generally prohibit undesired linear movement of the valve guide 16 along the direction of flow path, particularly in direction moving away from the fluid entry portion 20.

The present invention is not limited to the connection between the valve guide 16 and the body 12 as described above. For instance, the connection element 38 of the guide 16 may take the form of a female connection component (such as a recess), and the receiving portion 40 of the body 12 may correspondingly take the form of a protruding formation that extends radially inward into the body opening to engage the connection element of the guide. Further, the body 12 may include additional engagement means, such as a pin, threads, or a nut, which may be separate or integral with the components, to retain the valve 16 at a desired position. Additionally, if desired for certain applications, the assembly 10 may further include additional components, such as, without limitation, a split ring, a ring, threading, an external nut (e.g., a B-nut identified as 48) or a wire (such as industry standard-type wires 50).

As previously noted, the invention permits all of the internal components of the valve and associated guide to be inserted into place via an outlet port opening and to substantially lock into a stable engagement with the body 12. One embodiment of such a method for manufacturing a valve assembly involves the following steps (which are not necessarily in order): (a) providing a body 12 that includes a central longitudinal axis L, a shaped cavity, a fluid entry portion 20, and a fluid outlet portion 22; (b) providing a valve 14 having a shaped valve head 26 that includes an exterior surface portion 30 that is configured to engage a portion of the shaped cavity 24; (c) providing a guide 16 including a central axis CA, a central opening 32 for receiving at least a portion of the elongated portion of the valve 28, and a plurality of radially disposed formations that connect the guide to the body; (d) providing a biasing mechanism (e.g., a spring 34) that biases (and may selectively bias) the valve in the direction of the shaped cavity; (e) assembling the guide 16, the biasing mechanism, and the valve 14 so that the biasing mechanism is disposed between a portion of the guide 16 and valve 14; (f) inserting the guide 16, the biasing mechanism, and the valve 14 into the body through the fluid outlet opening 22; and (g) connecting the guide 16 to the body 12. Upon connection, the guide 16 should be substantially retained relative to the body 12 and the central axis CA of the guide 16 should be substantially in alignment with the central longitudinal axis L of the body 12 such that a sufficient surface to surface seal can be made between a portion of the shaped surface 30 of the valve head 26 and an engaged portion 24 of the shaped cavity when the assembly is in a "closed" configuration.

In an embodiment of the method, one or more of the radially disposed formations include front and rear centering formations and may include a guide leg 36 (which may or may not include a connection element 38 as previously discussed) that is radially spaced from the rest of the body of the formation. With such a method, the centering formations 39*a*, 39*b* are used to position the guide within a desired configuration within the body. When present, the guide leg 36 can be used to assist with both the orientation and the retention of the guide 16 within the body 12 of the assembly 10. Further the connection may also entail the inclusion and engagement of additional connection devices, which may include, without limitation, wires, rings, split rings, nuts, pins, etc. Such additional connection devices can be used for, among other things, to provide further retention of the aforementioned components within the assembly.

In one embodiment of the method, the guide leg includes one or more guide legs with connection elements and the body includes one or more corresponding grooves or recesses for receiving a portion of the guide leg. Moreover, if desired, the guide leg may be tapered or cantilevered radially outwardly. When the guide is properly oriented and inserted into the body, the connection elements of the guide leg may "snap into" (radially outwardly) or otherwise engage the corresponding grooves or recesses and the guide will be appropriately oriented and retained within the body.

The foregoing method of assembly can commonly simplify the manufacturing process. Moreover, the invention can also, among other things, reduce the associated manufacturing/assembly costs; reduce the weight of the assembly; eliminate the need for radial retaining rings, or the need to swage or thread the valve assembly into place; and can provide reduced weight.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A valve assembly comprising:

a body including a central longitudinal axis, a shaped cavity, a fluid entry portion, and a fluid outlet portion having a stem portion, the elongated portion having a larger diameter than the stem portion; a valve including a shaped valve head and an elongated portion, the valve head including an exterior surface, a portion of the exterior surface being configured to engage a portion of the shaped cavity to provide a fluid seal, wherein portions of the shaped valve head and portions of the shaped cavity have a form characterized as a modified ellipsoid; and a guide that guides the axial movement of the valve, the guide including a centrally disposed opening with a central axis, the opening being at least partially defined by first and second surfaces sized to receive of the elongated and stem portions of the valve, respectively;

the guide further including a plurality of radially disposed formations that connect the guide to the body, retain the guide in an axial direction, and position the guide so that the central axis of the guide is substantially aligned with the central longitudinal axis of the body, the radially disposed formations including at least one resilient guide leg having a connection element for engaging a corresponding receiving portion in the body;

wherein a fluid flow path is formed between the valve, the radially disposed formations and the body.

2. A valve assembly as recited in claim 1, including a biasing mechanism that biases the valve head in the direction of the shaped cavity.

3. A valve assembly as recited in claim 2, wherein the biasing mechanism includes a spring.

4. A valve assembly as recited in claim 3, wherein the spring is disposed between the first surface of the guide and the stem portion of the valve.

5. A valve assembly as recited in claim 3, wherein ends of the spring engage an edge of the valve on one side and an edge of the guide on the opposite side.

6. A valve assembly as recited in claim 3, wherein the spring includes spring segments that are substantially constrained from overlapping along its length by the first surface of the valve on one side and by the stem portion of the guide on the opposite side.

7. A valve assembly as recited in claim 1, wherein the valve head engages and disengages with a portion of the shaped cavity to control the flow of fluid through the assembly.

8. A valve assembly as recited in claim 1, wherein the body comprises a single integral component.

9. A valve assembly as recited in claim 1, wherein the radially disposed formations include a front centering formation and a rear centering formation.

10. A valve assembly as recited in claim 9, wherein a throat area is provided between the cavity and the fluid outlet portion, wherein the front centering formation is positioned at or adjacent the throat area of the body and the rear centering formation is positioned at or adjacent the fluid outlet portion of the body.

11. A valve assembly as recited in claim 9, wherein a throat area is provided between the cavity and the fluid outlet portion, wherein the front centering formations provide at least three points of contact with the body at or about the throat area and the rear centering formations provide at least three points of contact with the body at or about the fluid outlet portion.

12. A valve assembly as recited in claim 1, wherein the guide supports the valve through its full range of motion.

13. A valve assembly as recited in claim 1, wherein the first surface of the guide engages of the elongated portion of the valve and the second surface of the guide engages the stem portion of the valve.

14. A valve assembly as recited in claim 1, wherein the guide provides a stop to restrain the linear movement of the valve away from the fluid entry portion of the cavity.

15. A valve assembly as recited in claim 1, wherein the fit between the second surface of the guide and the stem portion of the valve provides a dampening effect with respect to the axial movement of the valve.

16. A valve assembly as recited in claim 1, wherein the guide leg is integral with and extends rearwardly from a front centering formation of the guide.

17. A valve assembly as recited in claim 1, wherein there is a gap between a portion of the guide leg and a portion of the guide.

18. A valve assembly as recited in claim 1, wherein at least a portion of the guide leg tapers radially outward in an unassembled condition.

19. A valve assembly as recited in claim 1, wherein the guide includes three resilient guide legs, each guide leg including a connection element for engaging a corresponding receiving portion in the body.

20. A valve assembly as recited in claim 19, wherein the guide legs are spaced at approximately 120 degree intervals.

21. A valve assembly as recited in claim 1, wherein the valve head and the shaped cavity are comprised of a metal.

22. A valve assembly as recited in claim 1, wherein the surface-to-surface seal between the portions of the valve head and the portion of the shaped cavity is sufficiently tight to prevent leakage.

23. A valve assembly as recited in claim 1, wherein the connection element exerts an outwardly directed radial force to at least partially secure the guide within the body.

24. A valve assembly as recited in claim 1, wherein the shaped valve head has a surface that is a combination of several tangent radii.

25. A valve assembly as recited in claim 1, wherein the connection element includes a male connection element and the corresponding receiving portion includes a groove, recess, or cavity.

26. A valve assembly as recited in claim 25, wherein the recess, groove or cavity is positioned under a portion of a fitting or other reinforcing component.

27. A valve assembly as recited in claim 1, wherein the connection element includes a groove, recess, or cavity and the corresponding receiving portion includes a protrusion extending radially inward from an inner surface of the body.

28. A valve assembly as recited in claim 1, wherein the connection element is biased radially outward.

29. A valve assembly comprising:

an integral body including a central longitudinal axis, a shaped cavity, a fluid entry portion, and a fluid outlet portion;

a valve including a modified-ellipsoid shaped valve head an elongated portion with a first diameter, and a stem portion with a second diameter that is less than the first diameter, the valve head including an exterior surface that is configured to engage a portion of the shaped cavity to provide a fluid seal;

a means for biasing the valve head in the direction of the shaped cavity; and a guide that guides the axial movement of the valve and includes a centrally disposed opening with a central axis, the opening being at least partially defined first and second surfaces configured to elongated and stem portions of the valve respectively;

the guide further including at least two front centering formations, at least two rear centering formations, and at least one axially extending, cantilevered guide leg that includes a connection element for engaging a corresponding groove or recess in the body, so that the central axis of the guide is substantially aligned with the central longitudinal axis of the body;

wherein the means for biasing is retained between the stem portion of the valve and the first surface of the guide.

30. A valve assembly as recited in claim 29, wherein the connection element is biased radially outward.

31. A valve assembly as recited in claim 29, wherein the connection element exerts an outwardly directed radial force to at least partially secure the guide within the body.

32. A method for making a valve assembly comprising:

providing a body including a central longitudinal axis, a shaped cavity, a fluid entry portion, and a fluid outlet opening; a valve having a shaped valve head that includes an exterior surface portion that is configured to engage a portion of the shaped cavity, wherein portions of the shaped valve head and portions of the shaped cavity have a form characterized as a modified ellipsoid, the valve including an elongated portion with a first diameter and a stem portion with a second diameter that is less than the first diameter; a guide including a central axis, a central opening being at least partially defined by first and second surfaces, and a plurality of radially disposed formations that connect the guide to the body, the radially disposed formations including at least one guide leg having a connection element for engaging a corresponding receiving portion in the body;

assembling the guide and the valve so that the first and second surfaces of the guide slidably engage the elongated and stem portions of the valve, respectively;

axially inserting the guide and the valve into the body through the fluid outlet opening, such that the connection element is biased radially outward; and continuing to axially insert the guide and the valve into the body until the connection element moves radially outward to engage the receiving portion in the body, so that the guide is substantially retained relative to the body and the central axis of the guide is substantially in alignment with the central longitudinal axis of the body.

33. A method as recited in claim 32, including the step of providing a biasing mechanism that biases a portion of the valve head to engage the shaped cavity.

34. A method as recited in claim 33, wherein the biasing mechanism is assembled with the guide and valve.

35. A method as recited in claim 33, wherein the biasing mechanism is disposed between at least a portion of the valve and a portion of the guide.

36. A method as recited in claim 32, including the step of connecting a separate connection device or component to the assembly.

37. A method as recited in claim 32, wherein the connection element includes a male connection element and the corresponding receiving portion includes a groove, recess, or cavity.

38. A method as recited in claim 32, wherein the connection element includes a groove, recess, or cavity and the corresponding receiving portion includes a protrusion extending radially inward from an inner surface of the body.

* * * * *